United States Patent
Brausch et al.

(10) Patent No.: US 8,889,009 B2
(45) Date of Patent: Nov. 18, 2014

(54) PROCESS FOR PURIFYING LOW MOLECULAR WEIGHT HYDRIDOSILANES

(75) Inventors: Nicole Brausch, Essen (DE); Goetz Baumgarten, Haltern am See (DE); Guido Stochniol, Haltern am See (DE); Yuecel Oenal, Erlenbach (DE); Martin Trocha, Essen (DE)

(73) Assignee: Evonik Degussa GmbH, Essen (DE)

( * ) Notice: Subject to any disclaimer, the term of this patent is extended or adjusted under 35 U.S.C. 154(b) by 890 days.

(21) Appl. No.: 13/123,827

(22) PCT Filed: Oct. 9, 2009

(86) PCT No.: PCT/EP2009/063135
§ 371 (c)(1),
(2), (4) Date: Apr. 12, 2011

(87) PCT Pub. No.: WO2010/060676
PCT Pub. Date: Jun. 3, 2010

(65) Prior Publication Data
US 2011/0268642 A1    Nov. 3, 2011

(30) Foreign Application Priority Data
Nov. 3, 2008   (DE) .......................... 10 2008 043 422

(51) Int. Cl.
*C01B 33/04* (2006.01)
*C07F 7/02* (2006.01)
*B01D 61/00* (2006.01)

(52) U.S. Cl.
CPC ............... *C01B 33/04* (2013.01); *C01B 33/046* (2013.01); *B01D 61/00* (2013.01)

USPC ............ 210/644; 210/650; 210/651; 210/652

(58) Field of Classification Search
CPC ....... C01B 33/04; C01B 33/046; B01D 61/00
USPC ......... 210/644, 649, 650, 651, 652, 653, 654, 210/903, 906
See application file for complete search history.

(56) References Cited

U.S. PATENT DOCUMENTS 4,978,726 A    12/1990 Döhler et al.
4,988,525 A    1/1991 Gresch
(Continued)

FOREIGN PATENT DOCUMENTS

EP    1035126 A2 *  9/2000
GB    2 077 710       12/1981
(Continued)

OTHER PUBLICATIONS

U.S. Appl. No. 13/498,206, filed Mar. 26, 2012, Brausch, et al.
(Continued)

*Primary Examiner* — Fred Prince
(74) *Attorney, Agent, or Firm* — Oblon, Spivak, McClelland, Maier & Neustadt, L.L.P.

(57) ABSTRACT

The present invention relates to a process for purifying low molecular weight hydridosilane solutions, in which a solution to be purified comprising a) at least one low molecular weight hydridosilane, b) at least one solvent and c) at least one impurity selected from the group of the compounds having at least 20 silicon atoms and/or the group of the homogeneous catalyst systems is subjected to a crossflow membrane process with at least one membrane separation step using a permeation membrane.

20 Claims, 2 Drawing Sheets

(56) References Cited

U.S. PATENT DOCUMENTS

| | | |
|---|---|---|
| 5,145,915 A | 9/1992 | Weitemeyer et al. |
| 5,146,005 A | 9/1992 | Weitemeyer et al. |
| 5,260,402 A | 11/1993 | Weitemeyer et al. |
| 6,027,705 A | 2/2000 | Kitsuno et al. |
| 6,211,322 B1 | 4/2001 | Döhler et al. |
| 6,268,404 B1 | 7/2001 | Döhler et al. |
| 7,250,204 B2 | 7/2007 | Brand et al. |
| 7,276,541 B2 | 10/2007 | Döhler et al. |
| 7,598,334 B2 | 10/2009 | Ferenz et al. |
| 7,605,284 B2 | 10/2009 | Brueckner et al. |
| 7,635,581 B2 | 12/2009 | Ferenz et al. |
| 7,727,599 B2 | 6/2010 | Doehler et al. |
| 7,759,402 B2 | 7/2010 | Venzmer et al. |
| 7,776,989 B2 | 8/2010 | Ferenz et al. |
| 7,838,603 B2 | 11/2010 | Schwab et al. |
| 7,838,614 B2 | 11/2010 | Thum et al. |
| 7,855,265 B2 | 12/2010 | Thum et al. |
| 7,893,128 B2 | 2/2011 | Busch et al. |
| 8,021,632 B2 | 9/2011 | Baumgarten et al. |
| 8,039,646 B2 | 10/2011 | Bade et al. |
| 8,138,294 B2 | 3/2012 | Henning et al. |
| 8,172,936 B2 | 5/2012 | Herrwerth et al. |
| 8,198,473 B2 | 6/2012 | Ferenz et al. |
| 8,211,972 B2 | 7/2012 | Meyer et al. |
| 8,226,829 B2 | 7/2012 | Wiese et al. |
| 8,246,925 B2 | 8/2012 | Schwarz et al. |
| 2002/0018854 A1* | 2/2002 | McCarthy et al. ............ 427/387 |
| 2005/0126966 A1 | 6/2005 | Tanida et al. |
| 2005/0136269 A1 | 6/2005 | Doehler et al. |
| 2006/0155090 A1 | 7/2006 | Ferenz |
| 2006/0160227 A1 | 7/2006 | Sethumadhavan et al. |
| 2007/0059539 A1 | 3/2007 | Doehler et al. |
| 2007/0123599 A1 | 5/2007 | Eilbracht et al. |
| 2007/0131611 A1 | 6/2007 | Peng et al. |
| 2007/0149723 A1 | 6/2007 | Schwab |
| 2007/0197678 A1 | 8/2007 | Cavaleiro et al. |
| 2007/0295243 A1 | 12/2007 | Dohler et al. |
| 2007/0299231 A1 | 12/2007 | Doehler et al. |
| 2008/0187702 A1 | 8/2008 | Ferenz et al. |
| 2009/0032465 A1 | 2/2009 | Baumgarten et al. |
| 2009/0136757 A1 | 5/2009 | Wursche et al. |
| 2009/0259063 A1 | 10/2009 | Lang et al. |
| 2010/0036011 A1 | 2/2010 | De Gans et al. |
| 2010/0160649 A1 | 6/2010 | Lang et al. |
| 2010/0179340 A1 | 7/2010 | Lang et al. |
| 2010/0185004 A1 | 7/2010 | Lang et al. |
| 2010/0187174 A1 | 7/2010 | Wursche et al. |
| 2010/0210445 A1 | 8/2010 | Von Rymon Lipinski et al. |
| 2010/0248325 A1 | 9/2010 | Eckstein et al. |
| 2010/0266651 A1 | 10/2010 | Czech et al. |
| 2010/0298485 A1 | 11/2010 | Frey et al. |
| 2011/0042004 A1 | 2/2011 | Schubert et al. |
| 2011/0046305 A1 | 2/2011 | Schubert et al. |
| 2011/0070175 A1 | 3/2011 | Herrwerth et al. |
| 2011/0091399 A1 | 4/2011 | Meyer et al. |
| 2011/0230619 A1 | 9/2011 | Kuppert et al. |
| 2011/0230633 A1 | 9/2011 | Ferenz et al. |
| 2011/0251070 A1 | 10/2011 | Poffenberger et al. |
| 2012/0010302 A1 | 1/2012 | Hartung et al. |
| 2012/0035382 A1 | 2/2012 | Priske et al. |
| 2012/0042951 A1 | 2/2012 | Stuetzel et al. |
| 2012/0046503 A1 | 2/2012 | Priske et al. |
| 2012/0214005 A1 | 8/2012 | Wieber et al. |
| 2013/0095026 A1 | 4/2013 | Oenal et al. |
| 2013/0099164 A1 | 4/2013 | Stochniol et al. |
| 2013/0168824 A1 | 7/2013 | Wieber et al. |

FOREIGN PATENT DOCUMENTS

| | | |
|---|---|---|
| TW | 200400082 A | 1/2004 |
| TW | 200632307 A | 9/2006 |
| TW | 200803968 A | 1/2008 |
| TW | 200835548 A | 9/2008 |
| WO | 89 01965 | 3/1989 |
| WO | 2007 085 321 | 8/2007 |

OTHER PUBLICATIONS

U.S. Appl. No. 13/510,373, filed Jul. 12, 2012, Wieber, et al.
U.S. Appl. No. 13/574,376, filed Jul. 20, 2012, Wieber, et al.
U.S. Appl. No. 14/005,413, filed Sep. 16, 2013, Oenal, et al.
U.S. Appl. No. 14/005,360, filed Sep. 16, 2013, Oenal, et al.
U.S. Appl. No. 14/005,979, filed Sep. 18, 2013, Wehner, et al.
U.S. Appl. No. 14/007,495, filed Sep. 25, 2013, Wehner, et al.
U.S. Appl. No. 13/513,225, filed Jun. 1, 2012, Haensel, et al.
U.S. Appl. No. 13/989,823, filed May 28, 2013, Wieber, et al.
U.S. Appl. No. 13/824,641, filed Mar. 18, 2013, Wieber, et al.
U.S. Appl. No. 13/991,261, filed Jun. 3, 2013, Stenner, et al.
U.S. Appl. No. 13/885,316, filed May 14, 2013, Stenner, et al.
U.S. Appl. No. 13/991,986, filed Jun. 6, 2013, Brausch, et al.
U.S. Appl. No. 13/522,514, filed Sep. 26, 2012, Stochniol, et al.
U.S. Appl. No. 13/816,569, filed May. 16, 2013, Latoschinski, et al.
U.S. Appl. No. 13/988,029, filed May 17, 2013, Becker, et al.
U.S. Appl. No. 13/977,984, filed Jul. 2, 2013, Schladerbeck, et al.
International Search Report issued Feb. 3, 2010 in PCT/EP09/63135 filed Oct. 9, 2009.
U.S. Appl. No. 12/999,151, filed Dec. 15, 2010, Brausch, et al.
Combined Taiwanese Office Action and Search Report issued Nov. 7, 2013, in Taiwanese Patent Application No. 098136964 with English translation.

* cited by examiner

PROCESS FOR PURIFYING LOW MOLECULAR WEIGHT HYDRIDOSILANES

The present invention relates to a process for purifying low molecular weight hydridosilanes or mixtures thereof.

Hydridosilanes or mixtures thereof, especially low molecular weight hydridosilanes or mixtures thereof, are discussed in the literature as possible reactants for the production of silicon layers. Hydridosilanes are understood to mean compounds which contain only silicon and hydrogen atoms and which have a linear, branched or (optionally bi-/poly-) cyclic structure with Si—H bonds.

For example, EP 1 087 428 A1 describes processes for producing silicon films, in which hydridosilanes with at least three silicon atoms are used. EP 1 284 306 A2 describes, inter alia, mixtures comprising a hydridosilane compound with at least three silicon atoms and at least one hydridosilane compound selected from cyclopentasilane, cyclohexasilane and silylcyclopentasilane, which can likewise be used to produce silicon films.

Low molecular weight hydridosilanes in the context of the present invention are understood to mean hydridosilanes having a maximum of 20 silicon atoms.

Hydridosilanes can be prepared, for example, by dehalogenation and polycondensation of halosilanes with alkali metals (GB 2 077 710 A).

Other processes for preparing hydridosilanes are based on a dehydropolymerization reaction of hydridosilanes, in which hydridosilane adducts are formed with formal elimination of $H_2$ from the hydrosilane reactants by thermal means (U.S. Pat. No. 6,027,705 A) or by using catalysts such as hydridic cyclopentadienyl complexes of scandium, yttrium or rare earths (U.S. Pat. No. 4,965,386 A, U.S. Pat. No. 5,252,766 A) and of transition metals or complexes thereof (JP 02-184513 A).

Advantageously, linear hydridosilanes of the general formula H—$(SiH_2)_n$—H (where n≥2) can be synthesized by a process in which one or more hydridosilanes, hydrogen and one or more transition metal compounds comprising elements of groups 8, 9 or 10 of the Periodic Table (Fe, Co, Ni, Ru, Rh, Pd, Re, Os, Ir, Pt) and the lanthanoids (Ce, Pr, Nd, Pm, Sm, Eu, Gd, Tb, Dy, Ho, Er, Tm, Yb, Lu) are reacted at a pressure of more than 5 bar absolute, then decompressed, and the hydridosilanes formed are removed from the reaction mixture obtained (EP 08158401.3, yet to be published at the priority date of the present application). The removal can be effected by the processes known to those skilled in the art, especially by means of distillation or by means of the use of adsorptive processes.

In this process and in other metal-catalyzed processes for preparing hydridosilanes, the metals used in a homogeneous catalysis are preferably used in combination with ligands such as bipyridyl, unsubstituted or substituted cyclopentadienyl, cyclooctadiene, CN, CO, alkylphosphine, arylphosphine, alkyl or aryl phosphite, alkylarylphosphine, bidentate phosphine ligands with bridging heterocycles or bridging aryl radicals, heteroatom-containing ligands, alkyldiphosphine $R^2R^1$—P$(CH_y)_x$P—$R^3R^4$ (where $R^1$, $R^2$, $R^3$ and $R^4$ are each independently alkyl or aryl and x=1-10 and y may be 0, 1 or 2), $R^2R^1$—P—$CR^5R^6(CR^7R^8)_x$—$CR^9R^{10}$—P—$R^3R^4$ (where $R^1$, $R^2$, $R^3$, $R^4$, $R^5$, $R^6$, $R^7$, $R^8$, $R^9$, $R^{10}$ are each independently H, alkyl or aryl, and x=1-10) and $R^1$—C≡C—$R^2$ (where $R^1$ and $R^2$ are each independently alkylphosphine or arylphosphine). The catalyst is generally prepared under protective gas atmosphere in situ in a suitable dried solvent (e.g. toluene, reflux over Na, benzophenone), and transferred into a reactor while maintaining a protective gas atmosphere. By adding the hydridosilane reactant(s) and optionally further gases such as inert gases or hydrogen, the mixture is then reacted. Depending on the parameters established, the desired hydridosilanes are then formed. The mixture formed, consisting of the hydridosilanes formed, solvent and any unconverted reactants, can, after removal of the homogeneous catalyst and relatively high molecular weight secondary components (i.e. those having more than 20 silicon atoms, especially corresponding polysilynes and polysilanes), be used for application in the semiconductor or photovoltaics sector, since, for a given purity of the feedstocks, no contamination by troublesome secondary components is to be expected.

For hydridosilanes prepared by means of a thermal dehydropolymerization reaction and for those prepared by means of dehalogenation and polycondensation of halosilanes with alkali metals, it is also desirable to be able to remove relatively high molecular weight by-products, i.e. those having more than 20 silicon atoms, especially corresponding hydridosilanes and polysilynes, from the reaction mixture, since these, especially in the case of high molecular weights, have the disadvantage of leading to inhomogeneities in the production of silicon layers.

Since thermal stress on these reaction solutions leads to further reaction of the silanes which have already formed and to formation of silyne-like solids and hence to a significant reduction in yield, a distillation even under reduced pressure is not the optimal separation methodology.

Compared to this, adsorptive purification methods, such as separation processes based on zeolites, have the disadvantage that they require a complicated purification step to purify the adsorbant.

Against this background, it was an object of the present invention to provide a process for removing impurities selected from the group of compounds having more than 20 silicon atoms, especially the corresponding hydridosilanes and polysilynes, and/or from the group of the homogeneous catalyst systems (consisting of at least one metal from the transition metals or the lanthanoids and at least one ligand) of low molecular weight hydridosilanes, which does not have the disadvantages of the prior art.

It has been found that, surprisingly, the present object is achieved by a process for purifying low molecular weight hydridosilane solutions, in which a solution to be purified comprising at least one low molecular weight hydridosilane, at least one solvent and at least one impurity selected from the group of the compounds having at least 20 silicon atoms (especially relatively high molecular weight hydridosilanes and polysilynes) and/or the group of the homogeneous catalyst systems is subjected to a crossflow membrane process with at least one membrane separation step using a permeation membrane.

A crossflow membrane process with a membrane separation step in the context of the present invention is understood to mean a pressure-driven membrane process in which the solution to be purified is contacted at a pressure $p_I$ with one side of a permeation membrane, and a purified solution, i.e. a solution which contains a lower concentration of the at least one impurity compared to the solution to be purified, is withdrawn on the other side of the permeation membrane at the pressure $p_{II}$, which is less than the pressure $p_I$. In the case of a crossflow membrane process with two membrane purification steps, the purified solution, after the first purification step, is contacted again with the permeation membrane at a pressure $p_I$ and withdrawn on the other side at a pressure $p_{II}$.

For three and more membrane separation steps, the number of additional further purification steps increases correspondingly.

In the case of such a membrane process, according to the separation limit required, ultra- or nanofiltration membranes and reverse osmosis membranes are used as permeation membranes. These usable membrane types include either porous permeable polymer or ceramic layers or permeable polymer or ceramic layers on a porous substructure, reverse osmosis membranes featuring a separation limit of <250 g/mol, nanofiltration membranes a separation limit of 250-1000 g/mol and ultrafiltration membranes a separation limit of 1000-100 000 g/mol.

Preferentially suitable are organophilic nanofiltration membranes as known from the workup of organic solvents, because this process can particularly efficiently remove dissolved impurities within a molar mass range of 250-1000 g/mol.

The literature (e.g. Solvent resistant nanofiltration: separating on a molecular level; Pieter Vandezande, Lieven E. M. Gevers and Ivo F. J. Vankelecom; Chem. Soc. Rev., 2008, 37, 365-405) discloses in general terms that relatively high molecular weight organic, i.e. carbon-containing, compounds can be removed from corresponding low molecular weight organic compounds by means of organophilic nanofiltration. It is also described there and additionally also in GB 1 453 504 or DE 10 2006 003 618 A1 that homogeneous catalyst-ligand systems can be removed from organic reaction products.

In contrast to this, there is no disclosure in the literature to date regarding the behaviour of hydridosilanes or mixtures thereof with respect to permeation membranes. Especially owing to the high instability of the silanes compared to the homologous alkanes, applicability of the experiences with alkanes was not to be expected. In contrast to the corresponding alkanes, the hydridosilanes are synthesizable only under exclusion of air. Silanes with one to four silicon atoms are also very unstable and can, for example, under air, self-ignite, explode and decompose spontaneously to silicon dioxide and water. It thus could not be assumed that the hydridosilanes to be purified would be inert with respect to the customary permeation membranes.

The process according to the invention additionally offers the advantage that it can be integrated into preparation processes for low molecular weight hydridosilanes, especially preparation processes based on metal-catalyzed dehydropolymerization, in a simple manner in terms of construction. Especially in the case of integration into a construction for metal-catalyzed dehydropolymerization, the catalyst-containing retentate stream which originates from a membrane separation step connected downstream of the reactor can be fed back to the reactor for recycling, while the purified product is discharged.

The purification process according to the invention also offers the surprising advantage that contaminated low molecular weight hydridosilane solutions which contain both impurities having more than 20 silicon atoms and impurities based on homogeneous catalysts—especially in the case of reaction product solutions from a synthesis of low molecular weight hydridosilanes by means of metal-catalyzed dehydropolymerization processes—can be removed by means of a single purification process.

The impurity or the impurities can be removed particularly efficiently when at least two membrane separation steps, preferably at least three membrane separation steps, are performed.

Particularly efficiently removable by means of the process according to the invention are hydridosilanes or polysilynes with molar masses more than 600 g/mol, preferably greater than 1000 g/mol. It is observed that the greater the molar mass ratio of impurity and product to be purified, the better impurities can be removed.

In addition, it is possible by means of the process according to the invention to particularly efficiently remove impurities selected from the group of the homogeneous catalyst systems which have a metal selected from groups 4, 5, 6, 7, 8, 9 or 10 of the Periodic Table, more preferably a metal selected from Fe, Co, Ni, Ru, Rh, Pd, Re, Os, Ir, Pt, W and Mo.

Particularly efficiently removable by means of the purification process according to the invention are also homogeneous catalyst systems which have a ligand selected from halogen, hydrogen, alkyl, aryl, alkylsilane, arylsilane, olefin, alkylcarboxyl, arylcarboxyl, acetylacetonatoalkoxyl, aryloxy, alkylthio, arylthio, substituted or unsubstituted cyclopentadienyl, cyclooctadiene, cyanoalkane, aromatic cyano compounds, CN, CO, NO, alkylamine, arylamine, pyridine, bipyridine, (hetero)alkylphosphine, (hetero)arylphosphine, (hetero)alkylarylphosphine, (hetero)alkyl phosphite, (hetero)aryl phosphite, alkyl stibane, aryl stibane, alkyl aryl stibane, alkyl arsane, aryl arsane or alkyl aryl arsane.

Particularly good results are achieved when the ligand is selected from bipyridyl, unsubstituted or substituted cyclopentadienyl, cyclooctadiene, CN, CO, alkylphosphine, arylphosphine, alkyl or aryl phosphite, alkylarylphosphine, bidentate phosphine ligands with bridging heterocycles or bridging aryl radicals, heteroatom-containing ligands, alkyldiphosphine $R^2R^1—P(CH_y)_xP—R^3R^4$ (where $R^1$, $R^2$, $R^3$ and $R^4$ are each independently alkyl or aryl and x=1-10 and y=0, 1 or 2), $R^2R^1—P—CR^5R^6(CR^7R^8)_x—CR^9R^{10}—P—R^3R^4$ (where $R^1$, $R^2$, $R^3$, $R^4$, $R^5$, $R^6$, $R^7$, $R^8$, $R^9$, $R^{10}$ are each independently H, alkyl or aryl and x=1-10) and $R^1—C\equiv C—R^2$ (where $R^1$ and $R^2$ are each independently alkylphosphine or arylphosphine).

Among these, in turn, systems with particularly high stability, i.e. those with organophosphorus ligands, especially those based on nickel or rhodium, are the best removable.

The process according to the invention is suitable for the purification of solvents based on a wide variety of different solvents. The best compatibility with the membranes typically used results when the at least one solvent of the solution to be purified is selected from the group of the aprotic nonpolar solvents, i.e. of the alkanes, substituted alkanes, alkenes, alkynes, aromatics without or with aliphatic or aromatic substituents, halogenated hydrocarbons, tetramethylsilane, or the group of the aprotic polar solvents, i.e. of the ethers, aromatic ethers, substituted ethers, esters or acid anhydrides, ketones, tertiary amines, nitromethane, DMF (dimethylformamide), DMSO (dimethyl sulphoxide) or propylene carbonate. The process according to the invention can more preferably be performed with solutions of toluene, n-hexane or tetradecane.

Membranes usable with preference for the crossflow membrane process are those which have, as a separation-active (permeable) layer, a polymer layer of polydimethylsiloxane (PDMS) or other polysiloxanes, polyimide (PI), polyamide-imide (PAI), acrylonitrile/glycidyl methacrylate (PANGMA), polyamide (PA), polyethersulphone (PES), polysulphone (PSU), cellulose acetate (CA), polyetherimide (PEI), polyvinylidene fluoride (PVDF), polyacrylonitrile (PAN), polyetheretherketone (PEEK), polycarbonate (PC), polybenzimidazole (PBI), polyacrylates, polyetheramide (PIA), polyethylene oxide amide (PEBAX), polyisobutylene (PIB), polyphenylene oxide (PPO), polyvinyl alcohol (PVA), sulphonated polyetheretherketones (SPEEK) or cellulose. Membranes also usable advantageously are those containing a separation-active layer of polymers with intrinsic microporosity (PIM) or hydrophobized ceramic membranes.

Preferred membranes are those based on PET/PAN/PDMS, which are traded under the oNF2 name by GMT, Rheinfelden, or PET/PAN/PI, which are traded under the name Starmem by Grace Davison, Littleton, Colo., USA.

Preference is given to using the membranes in the form of membrane modules, especially in the form of open-channel cushion module systems, in which the membranes are welded thermally to form membrane pockets, or in the form of wound modules in which the membranes are adhesive bonded to form membrane pockets and wound around a permeate collecting tube with feed spacers.

Membranes for use with preference are those which are permeable to molecules up to a molar mass of 400 g/mol.

The at least one membrane separation step of the crossflow membrane process is performed preferably at transmembrane pressure differences $\Delta p = p_I - p_{II}$ of 0.5 MPa, preferably 0.5-10 MPa, more preferably 1-5 MPa. Within this range, the separation process can be performed particularly efficiently.

In addition, the at least one membrane separation step of the crossflow membrane process, to achieve particularly good purification, is preferably performed at a temperature of 10-120° C., more preferably at 15-45° C.

The at least one membrane separation step of the crossflow membrane process is also, to achieve an equally good and rapid purification, preferably performed at overflow velocities at the membrane of 0.1 to 15 m/s.

The purification process according to the invention is particularly suitable for purifying low molecular weight hydridosilane solutions which are preparable by means of a process for the synthesis of linear hydridosilanes of the general formula H—$(SiH_2)_n$—H (where n≥2), in which one or more hydridosilanes, hydrogen and one or more transition metal compounds comprising elements of group 8, 9 or 10 of the Periodic Table (Fe, Co, Ni, Ru, Rh, Pd, Re, Os, Ir, Pt) and of the lanthanoids (Ce, Pr, Nd, Pm, Sm, Eu, Gd, Tb, Dy, Ho, Er, Tm, Yb, Lu) are reacted at a pressure of more than 5 bar absolute.

The purification process according to the invention can advantageously be integrated into processes for preparing low molecular weight hydridosilanes, especially preparation processes based on metal-catalyzed dehydropolymerization. Especially in the case of integration into preparation processes by means of metal-catalyzed dehydropolymerization, it is advantageously possible to feed a catalyst-containing retentate stream originating from a membrane separation step downstream of the reactor back to the reactor for recycling, while the purified product can be discharged in the permeate stream.

BRIEF DESCRIPTION OF THE SEVERAL VIEWS OF THE DRAWINGS

In FIG. 2, PI is a pressure display; TI is a temperature display; FU is a frequency converter; and PIZ is a device for determining pressure difference.

The following preliminary tests and examples are intended to illustrate the invention in detail, without restricting the scope of protection which is evident from the description and the claims.

Preliminary Tests

Polymer membranes composed of PET/PAN/PDMS and PET/PAN/PI are inserted into reaction systems which have been obtained after completion of a dehydropolymerization proceeding from monosilane, are yet to be purified further and consist of 1) a mixture of lower hydridosilanes having 2 to 10 silicon atoms, 2) the high molecular weight impurities formed in the dehydropolymerization, including polysilynes and hydridosilanes having more than 20 silicon atoms, 3) the toluene solvent and 4) the catalyst system consisting of i) the nickel acetylacetonate or rhodium acetate dimer metal precursor and ii) a phosphine or phosphite ligand (triphenylphosphine or bisdiphenylphosphinobenzene). It was found that, surprisingly, no changes were detectable in the insertion tests over two weeks.

EXAMPLES

Preparation of the System to be Purified 0.1 mmol of nickel acetylacetonate and a 2.1-fold excess of (±)-2,2'-bis(diphenyl-phosphino)-1,1'-binaphthyl are weighed in while maintaining a protective gas atmosphere (argon), and dissolved in approx. 30 ml of dry toluene. An inertized stainless steel autoclave equipped with a glass liner, thermocouple, pressure sensor, liquid sampling point, gas inlet and gas outlet is initially charged with the catalyst solution. The reactor is additionally charged with 120 ml of dry toluene.

The autoclave is charged with monosilane via the gas inlet until a pressure of approx. 60 bar is attained. Subsequently, the reactor is additionally charged with hydrogen until attainment of a pressure of approx. 70 bar. Thereafter, the reactor is heated to the desired temperature and the stirrer (700 rpm) is started. After a reaction time of 20 h, the reaction is ended, the reactor is decompressed and the liquid phase is analyzed by gas chromatography. Table 1 below shows the results of gas chromatography analyses 0.5, 1, 2, 3 and 20 h after the start of reaction for the distribution of the short-chain hydridosilanes.

TABLE 1

Results of the gas chromatography analysis

| | Areas detected in the GC after corresponding reaction time | | | | |
|---|---|---|---|---|---|
| | 0.5 | 1 | 2 | 3 | 20 |
| Monosilane | 2552806 | 5270670 | 6791620 | 5746166 | 4311954 |
| Disilane | 5137020 | 7926128 | 10653553 | 8490576 | 6131529 |
| Trisilane | 3908573 | 5708463 | 7630474 | 5596087 | 4066175 |

TABLE 1-continued

Results of the gas chromatography analysis

| | Areas detected in the GC after corresponding reaction time | | | | |
|---|---|---|---|---|---|
| | 0.5 | 1 | 2 | 3 | 20 |
| Tetrasilane | 2304489 | 3446239 | 4959430 | 3572319 | 2693252 |
| Benzene | 79562 | 67571 | 89084 | 59582 | 28211 |
| Pentasilane | 992595 | 1676832 | 2712526 | 2033741 | 1696334 |
| >Si6 | 199734 | 468813 | 1216554 | 892295 | 726990 |

Basic Description of the Purification Step

Figure 1:
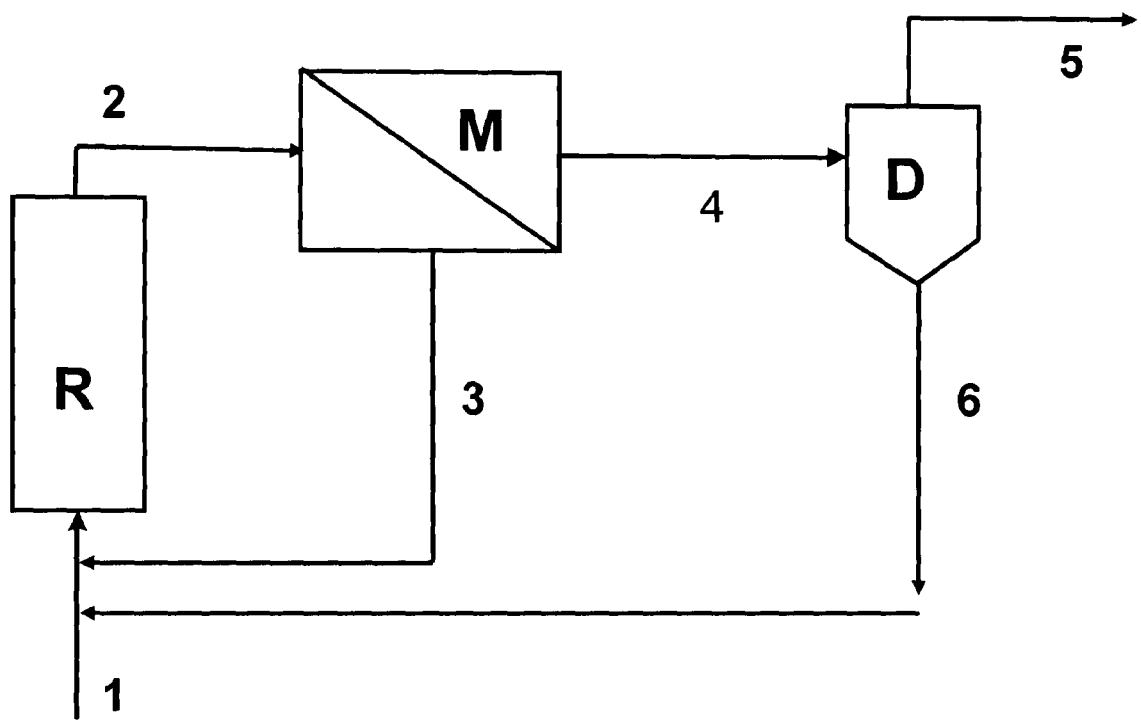
FIG. 1 shows a schematic diagram of an experimental setup for one embodiment of the process according to the invention. In this embodiment, the reactants 1 and a recycle stream 6 are fed into the reactor R for dehydrogenation, in which the polysilane synthesis takes place. The reactor may be a stirred tank or a tubular reactor. The reaction mixture 2 is conducted directly onto the membrane M. The retentate stream 3 obtained at the membrane is recycled into the reaction. The permeate stream 4 obtained at the membrane M is conducted into a thermal separating apparatus D, for example into a thin film evaporator. A separation is effected therein into polysilane product, which leaves the thermal separating apparatus as stream 5, and a stream 6 which contains high boilers, solvents, and complex catalyst, solvents and/or free ligands not removed in the membrane separation, and is recycled into the reactor R.
Figure 2:
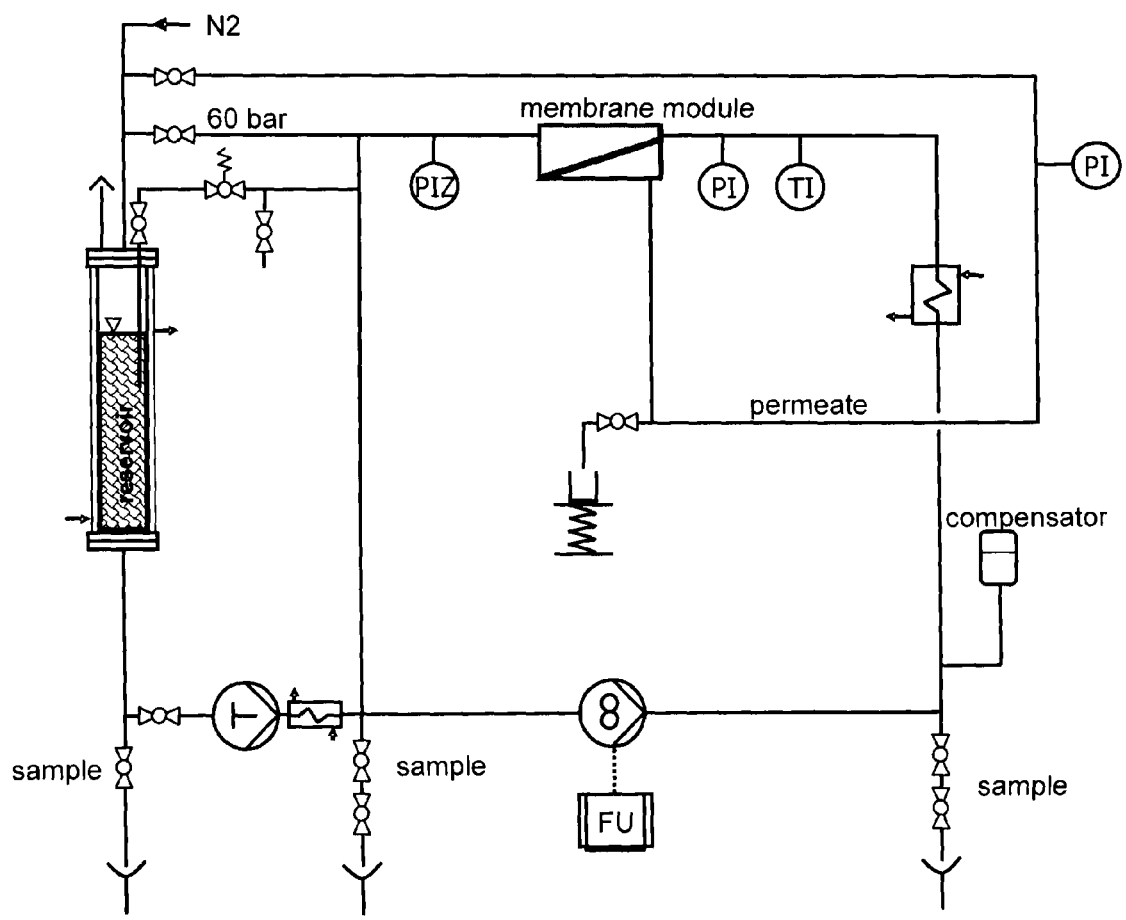
FIG. 2 shows a schematic diagram of an existing plant with the setup. The existing plant with the setup is flushed with dried toluene and then purged (argon/reduced pressure in alternation). The reservoir is then charged with the reaction mixture to be purified while maintaining a protective gas atmosphere.

The existing plant with the setup according to FIG. 2 (abbreviations: PI—pressure display; TI—temperature display; FU—frequency converter; PIZ—device for determining pressure difference) is flushed with dried toluene and then purged (argon/reduced pressure in alternation). The reservoir is then charged with the reaction mixture to be purified while maintaining a protective gas atmosphere.

With the valve in the open position, the pump is switched on and the reaction mixture is conducted directly to the membrane. On attainment of a system pressure of 10 bar, the circulation pump is additionally switched on. The pressure is maintained by means of the pressure-retaining valve installed. The permeate is obtained at the membrane from the nanofiltration, and consists predominantly of dissolved hydridiosilanes in solvent. The retentate obtained in the nanofiltration contains the catalyst consisting of metal precursor and ligands, and impurities with more than 20 silicon atoms, dissolved in the solvent. These are concentrated in the retentate.

Example 1

450 ml of the reaction mixture described are initially charged. The reaction mixture to be purified passes into the membrane module designed as a flat membrane test cell from Dauborn Membransysteme, Ratzeburg, with an area of 80 cm². In this module was a PDMS membrane of the oNF2 type from GMT, Rheinfelden, Germany, through which there was a flow of 100 l/h with a transmembrane pressure of 15 bar. After obtaining 225 ml of permeate, the permeate flow performance was determined, and the system retention based on the phosphorus and nickel catalyst constituents was determined in the permeate mixture and retentate.

Example 2

450 ml of the reaction mixture described are initially charged. The reaction mixture to be purified passes into the membrane module designed as a flat membrane test cell from Dauborn Membransysteme, Ratzeburg, with an area of 80 cm². In this module was a PI membrane of the Starmem 240 type from Grace, Littleton, Colo., USA, through which there was a flow of 100 l/h with a transmembrane pressure of 20 bar. After obtaining 225 ml of permeate, the permeate flow performance was determined, and the system retention based on the phosphorus and nickel catalyst constituents was determined in the permeate mixture and retentate.

Example 3

450 ml of the reaction mixture described are initially charged. The reaction mixture to be purified passes into the membrane module designed as a flat membrane test cell from Dauborn Membransysteme, Ratzeburg, with an area of 80 cm². In this module was a PI membrane of the Starmem 240 type from Grace, Littleton, Colo., USA, through which there was a flow of 100 l/h with a transmembrane pressure of 15 bar. After obtaining 360 ml of permeate, the permeate flow performance was determined, and the system retention based on the phosphorus and nickel catalyst constituents was determined in the permeate mixture and retentate.

The results of the membrane separation of Examples 1, 2 and 3 are shown in Table 2 below.

| | Example 1 | Example 2 | Example 3 |
|---|---|---|---|
| Membrane type | PDMS, oNF2, from GMT, Rheinfelden | Starmem 240, Grace Davison, Littleton, CO, USA | Starmem 240, Grace Davison, Littleton, CO, USA |
| Pressure (bar) | 15 | 15 | 20 |
| Temperature (° C.) | 30 | 30 | 37 |
| Permeate yield | 50% | 50% | 80% |
| Permeate flow (l/m²h) at end concentration | 37.5 | 21.7 | 12.0 |
| Retentate | | | |
| Ni (ppm) | 7 | 12 | 49 |
| Phosphorus (ppm) | 43 | 51 | 228 |
| Permeate | | | |
| Nickel (ppm) | <1 | <1 | 1 |
| Phosphorus (ppm) | 2 | <1 | 1 |

The invention claimed is:

1. A process for purifying a low molecular weight hydridosilane solution, comprising:
    subjecting a solution to be purified, comprising
    a. at least one low molecular weight hydridosilane,
    b. at least one solvent, and
    c. at least one impurity selected from the group consisting of a compound having at least 20 silicon atoms and a homogeneous catalyst system,
    to a crossflow membrane process with at least one membrane separation employing a permeation membrane.

2. The process of claim 1, wherein the permeation membrane is an ultrafiltration membrane, a nanofiltration membrane or a reverse osmosis membrane.

3. The process of claim 1, wherein the solution to be purified comprises
    a. at least one impurity selected from the group consisting of compounds having at least 20 silicon atoms, and
    b. at least one impurity from a homogeneous catalyst system.

4. The process of claim 1, wherein the crossflow membrane process comprises at least a first and a second membrane separation.

5. The process of claim 1, wherein the at least one impurity is
    a. at least one hydrosilane or polysilyne
    b. with a molar mass of more than 600 g/mol.

6. The process of claim 1, wherein the at least one impurity is a homogeneous catalyst system which comprises a metal selected from group 4, 5, 6, 7, 8, 9, or 10 of the Periodic Table.

7. The process of claim 1, wherein the at least one impurity is a homogeneous catalyst system which comprises a ligand selected from the group consisting of halogen, hydrogen, alkyl, aryl, alkylsilane, arylsilane, olefin, alkylcarboxyl, arylcarboxyl, acetylacetonatoalkoxyl, aryloxy, alkylthio, arylthio, substituted cyclopentadienyl, unsubstituted cyclopentadienyl, cyanoalkane, an aromatic cyano compound, CN, CO, NO, alkylamine, arylamine, pyridine, alkylphosphine, arylphosphine, alkylarylphosphine, alkyl phosphite, aryl phosphite, alkyl stibane, aryl stibane, alkyl aryl stibane, alkyl arsane, aryl arsane, and alkyl aryl arsane.

8. The process of claim 1, wherein the at least one solvent of the solution to be purified is selected from the group consisting of an aprotic nonpolar solvent and an aprotic polar solvent.

9. The process of claim 8, wherein the solvent is toluene, n-hexane, or tetradecane.

10. The process of claim 1, wherein the membrane for the at least one membrane separation of the crossflow membrane process is at least one membrane selected from the group consisting of
   a. a membrane comprising, as the separation-active layer, a polymer layer of polydimethylsiloxane (PDMS) or at least one other polysiloxanes, polyimide (PI), polyamideimide (PAI), acrylonitrile/glycidyl methacrylate (PANGMA), polyamide (PA), polyethersulphone (PES), polysulphone (PSU), cellulose acetate (CA), polyetherimide (PEI), polyvinylidene fluoride (PVDF), polyacrylonitrile (PAN), polyetheretherketone (PEEK), polycarbonate (PC), polybenzimidazole (PBI), at least one polyacrylate, polyetheramide (PIA), polyethylene oxide amide (PEBAX), polyisobutylene (PIB), polyphenylene oxide (PPO), polyvinyl alcohol (PVA), at least one sulphonated polyetheretherketone, (SPEEK) or cellulose,
   b. a membrane comprising a separation-active layer of at least one polymer with intrinsic microporosity (PIM), and
   c. a hydrophobized ceramic membrane.

11. The process of claim 1, wherein the membrane for the at least one membrane separation of the crossflow membrane process is at least one membrane module selected from the group consisting of
   a. an open-channel cushion module system in which the membranes are welded thermally to form membrane pockets, and
   b. a wound module in which the membranes are adhesive bonded to form membrane pockets and are wound around a permeate collecting tube with feed spacers.

12. The process of claim 1, wherein the membrane for the at least one membrane separation of the crossflow membrane process is permeable to molecules up to a molar mass of 400 g/mol.

13. The process of claim 1, wherein the at least one membrane separation of the crossflow membrane process is performed at a transmembrane pressure difference of ≥0.5 MPa.

14. The process of claim 1, wherein the at least one membrane separation of the crossflow membrane process is performed at a temperature of 10-120°C.

15. The process of claim 1, wherein the at least one membrane separation of the crossflow membrane process is performed at overflow velocities at the membrane of 0.1 to 15 m/s.

16. The process of claim 1, wherein the low molecular weight hydridosilane solution to be purified is obtained by a process for synthesizing at least one linear hydridosilane of formula $H-(SiH_2)_n-H$, where n≥2,
   wherein at least one hydridosilane, hydrogen, and at least one transition metal compound comprising at least one element of group 8, 9, or 10 of the Periodic Table (Fe, Co, Ni, Ru, Rh, Pd, Re, Os, Ir, Pt) and of the lanthanoids (Ce, Pr, Nd, Pm, Sm, Eu, Gd, Tb, Dy, Ho, Er, Tm, Yb, Lu) are reacted at a pressure of more than 5 bar absolute.

17. The process of claim 1, integrated into a process for preparing the at least one low molecular weight hydridosilane in such a way that a catalyst-comprising retentate stream originating from a membrane separation downstream of a synthesis reactor is fed back to the reactor for recycling.

18. The process of claim 17, wherein the permeate stream originating from the membrane separation is discharged.

19. The process of claim 1, wherein the permeation membrane is an organophilic nanofiltration membrane.

20. The process of claim 1, wherein the crossflow membrane process comprises at least a first, second, and third membrane separation.

* * * * *